(12) United States Patent
Joshi (10) Patent No.: US 9,292,021 B2
(45) Date of Patent: Mar. 22, 2016

(54) LINE COMMUNICATION WITH TWINNED HVAC UNITS

(71) Applicant: Emerson Electric Co., St. Louis, MO (US)

(72) Inventor: Rajan Joshi, Maharashtra (IN)

(73) Assignee: Emerson Electric Co., St. Louis, MO (US)

(*) Notice: Subject to any disclaimer, the term of this patent is extended or adjusted under 35 U.S.C. 154(b) by 515 days.

(21) Appl. No.: 13/941,667

(22) Filed: Jul. 15, 2013

(65) Prior Publication Data

US 2014/0025184 A1 Jan. 23, 2014

(30) Foreign Application Priority Data

Jul. 18, 2012 (IN) .......................... 2060/MUM/2012

(51) Int. Cl.
*G05D 23/19* (2006.01)
*H04B 3/54* (2006.01)
*H04L 5/14* (2006.01)

(52) U.S. Cl.
CPC .................. *G05D 23/19* (2013.01); *H04B 3/54* (2013.01); *H04B 2203/5416* (2013.01)

(58) Field of Classification Search
CPC ......... H04L 5/14; H04L 7/0041; G05D 23/19
See application file for complete search history.

(56) References Cited

U.S. PATENT DOCUMENTS

| | | | | | |
|---|---|---|---|---|---|
| 4,301,534 | A * | 11/1981 | Genter | ................. | H04J 3/0608 370/510 |
| 5,311,554 | A * | 5/1994 | Morera | ................. | G08B 5/227 340/7.3 |
| 5,316,073 | A * | 5/1994 | Klaus | ................. | F24F 11/0009 165/11.1 |
| 5,727,928 | A | 3/1998 | Brown | | |
| 6,539,047 | B1 * | 3/2003 | Moon | ................. | H04B 1/70758 375/135 |
| 6,606,871 | B2 * | 8/2003 | Butcher | ............. | F24F 11/0086 62/175 |
| 7,006,588 | B2 * | 2/2006 | Simmons | ............. | H04J 3/0608 375/355 |
| 7,163,158 | B2 * | 1/2007 | Rossi | ................. | F24F 11/0009 236/51 |
| 7,243,004 | B2 | 7/2007 | Shah et al. | | |
| 7,377,120 | B2 | 5/2008 | Zikes | | |
| 7,648,077 | B2 * | 1/2010 | Rossi | ................. | F24F 11/0009 236/1 C |
| 8,091,373 | B2 * | 1/2012 | Hugghins | ........... | F24F 11/0009 62/125 |
| 8,564,400 | B2 * | 10/2013 | Grohman | ............. | G05B 19/042 340/3.1 |
| 8,594,244 | B2 * | 11/2013 | Chen | ....................... | G01S 19/24 375/329 |
| 2005/0145705 | A1 * | 7/2005 | Shah | ................... | F24F 11/0086 236/51 |
| 2007/0068179 | A1 * | 3/2007 | Zikes | ................... | F24F 11/0009 62/175 |
| 2012/0149303 | A1 * | 6/2012 | Moes | ................... | H04B 5/0025 455/41.1 |
| 2013/0274940 | A1 * | 10/2013 | Wei | ....................... | G05B 19/02 700/291 |
| 2014/0095654 | A1 * | 4/2014 | Finnerty | ................ | G05B 15/02 709/217 |

FOREIGN PATENT DOCUMENTS

AU WO 2006069420 A1 * 7/2006 ............... H04B 3/54

* cited by examiner

*Primary Examiner* — Kenneth M Lo
*Assistant Examiner* — Michael J Huntley
(74) *Attorney, Agent, or Firm* — Harness, Dickey & Pierce, P.L.C.

(57) ABSTRACT

Disclosed are exemplary embodiments of systems and methods to communicate data over at least one wire line between units each associated with a control system. In an exemplary embodiment, a conditioned input AC signal serves as a reference signal for data to be transmitted. In phase or out of phase state of the conditioned reference signals is determined by dividing the reference signal into predetermined number of segments, generating a template signal frame and a data signal frame at predetermined segments, generating an interrupt signal in each control system on a predetermined location on the reference signal, logically ORing the template and data signal frames, transmitting the ORed signal, and analyzing the ORed signal to determine phase of the reference signal provided to each control system. If the reference signal is out of phase, the interrupting signal is shifted to correct the out of phase state of the reference signal.

20 Claims, 5 Drawing Sheets

LINE COMMUNICATION WITH TWINNED HVAC UNITS

CROSS-REFERENCE TO RELATED APPLICATION

This application claims the benefit and priority of India Patent Application No. 2060/MUM/2012, filed Jul. 18, 2012. The entire disclosure of the above application is incorporated herein by reference.

FIELD

The present disclosure generally relates to the field of data communication between a plurality of units.

BACKGROUND

This section provides background information related to the present disclosure which is not necessarily prior art.

Sophisticated units for cooling/heating of enclosed spaces such as residential and commercial buildings have been developed for providing greater comfort to occupants of such spaces. Typically, in any unit, control systems are coupled with the unit for controlling the operation of the unit. Control systems generate signals which turn the unit ON/OFF, thereby providing a comfortable temperature regulated environment. Typically, control systems generate these signals in response to signals from feedback systems.

For large residences or commercial installations, where capacity requirements for cooling/heating of an enclosed space are high, instead of using a single large unit, it is preferable to use two or more units together in order to provide sufficient cooling/heating of the given enclosed space. Furthermore, medium sized residences, stores, and such other facilities are generally cooled/heated by small units operating in parallel. Operating multiple units together creates problems in control and cooperation of the units. To overcome such problems, two units are twinned and controlled together so that both units function identically providing more effective cooling/heating and avoiding large swings in room temperature.

Typically units are twinned/synchronized for improved airflow or to maintain adequate amount of air pressure. Twinning is used in applications where more heating or airflow capacity is needed than what one unit can deliver. Twinning is used to make two units operate in tandem, using a single duct system and a feedback system causing units to turn ON/OFF simultaneously.

To provide efficient cooling/heating, control systems are based on the characteristics of associated units as well as requirements of the enclosed space. Control systems typically communicate control information between twinned/synchronized units. In certain situations where units are located far away from each other, communicating control information between the twinned/synchronized units becomes more complex, especially if data is to be communicated on a single line. As units become even more sophisticated and perform more advanced functions, complexity of control systems and communication between the systems increase.

As used herein, the expression "unit" refers to and includes, but is not limited to, an HVAC unit, a furnace, an air-handler, a thermostat, a temperature control unit, a pressure control unit, an electric motor, a compressor, a valve, a regulator, a gearbox, a circulator, and the like. The expression "controller" used herein refers to and includes, but is not limited to, microcontrollers, microprocessors, Application Specific Integrated Circuits (ASIC), Digital Signal Processors (DSP), and the like. These definitions are in addition to those expressed in the art.

SUMMARY

This section provides a general summary of the disclosure, and is not a comprehensive disclosure of its full scope or all of its features.

Disclosed are exemplary embodiments of systems and methods to communicate data over at least one wire line between units each associated with a control system. In an exemplary embodiment, a conditioned input AC signal serves as a reference signal for data to be transmitted. In phase or out of phase state of the conditioned reference signals is determined by dividing the reference signal into predetermined number of segments, generating a template signal frame and a data signal frame at predetermined segments, generating an interrupt signal in each control system on a predetermined location on the reference signal, logically ORing the template and data signal frames, transmitting the ORed signal, and analyzing the ORed signal to determine phase of the reference signal provided to each control system. If the reference signal is out of phase, the interrupting signal is shifted to correct the out of phase state of the reference signal.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

The inventor hereof has recognized a need for a method that enables efficient communication of data between a plurality of units. Furthermore, the inventor has also recognized a need for a method to effectively control units operating simultaneously including units which are located far away from each other. More particularly, the inventor hereof has recognized that there is a need for a method that provides an effective solution for controlling multiple units operating simultaneously while enabling seamless transfer of information between the units. Accordingly, the inventor has developed and discloses herein exemplary embodiments of line communication methods.

In accordance with exemplary embodiments of the present disclosure, there is provided a line communication method to communicate data over at least one wire line between a plurality of units, where each of the plurality of units are associated with a control system that includes a controller. The line communication method generally includes providing a voltage signal to each controller, providing an input AC power supply to each of the plurality of units, conditioning each of the input AC power supplies to generate a conditioned reference signal for each controller, and determining in phase or out of phase state of the conditioned reference signals. Determining in phase or out of phase state of the conditioned reference signals, the method generally includes feeding the conditioned reference signal to each controller, dividing the conditioned reference signal into a predetermined number of segments, each of the segments associated with a time period, generating a template signal frame and a data signal frame at predetermined segments of the conditioned reference signal, generating an interrupt signal in each controller on a first predetermined location on the conditioned reference signal, the interrupt signal being a reference point on each of the conditioned reference signals, the first predetermined location being identical for each controller, logically ORing of the template signal frame and the data signal frame, transmitting the logically ORed signal over the at least one wire line, and analyzing the transmitted ORed signal relative to the reference point for detecting existence or non-existence of the template signal frame thereby determining the in phase or out of phase state of the conditioned reference signals. The method further includes correcting the out of phase state of the conditioned reference signal in the event that non-existence of the template signal frame is detected, by shifting the interrupt signal thereby the reference point of at least one controller to a second predetermined location on the conditioned reference signal, to align the reference point on each of the conditioned reference signals. The method also additionally includes transmitting the data from the data signal frame of the phase corrected conditioned reference signal over the at least one wire line based on predetermined priority.

The step of transmitting the data may further include the step of noise elimination by at least one method consisting of Cyclic Redundancy Check (CRC), checksum and parity bits.

Typically, the plurality of units is selected from the group consisting of HVAC units, furnace, air handler units, air conditioner units, heat pump unit, and thermostats. Typically, the controller is selected from the group consisting of microcontrollers, microprocessors, Application Specific Integrated Circuits (ASIC) and Digital Signal Processors (DSP). Preferably, the template signal frame is a constant reserved data. Typically, the data signal frame is a variable frame depending on the application of the unit and representing the data being transmitted. Typically, the predetermined priority is determined by the controller and the data is transmitted by the unit having highest priority. Preferably, the data transmitted over the at least one wire line is logical AND-ing of data transmitted by each of the plurality of units.

Alternatively, the controller assigns a pre-determined time slot to each of the plurality of units for transmitting the data in a circular manner or the data transmitted over the at least one wire line is queued data transmitted in a predetermined order based on the predetermined priority. The exemplary embodiments of the present disclosure may be applied to twinned units or a plurality of units requiring communication of data for seamless, efficient transmission, and/or control.

Exemplary embodiments disclosed herein may provide one or more (but not necessarily any or all) of the following advantages. For example, exemplary embodiment may enable systematic, consistent and seamless communication of information on a single line between multiple units operating simultaneously. Exemplary embodiments may provide an efficient control of multiple units operating simultaneously. Exemplary embodiments may provide an efficient control of multiple units which are located far away from each other. Exemplary embodiments may provide a communication method that can transmit unlimited amount of data between multiple units operating simultaneously. Exemplary embodiments may synchronize multiple units to provide a relatively more efficient cooling/heating of an enclosed space.

With reference now to the figures, exemplary embodiments of a method of line communication embodying one or more aspects of the present disclosure will be described. The embodiments do not limit the scope and ambit of the disclosure. The description relates purely to the examples and preferred embodiments of the disclosed method and its suggested applications.

Typically, units are operated simultaneously for improved airflow and to maintain an adequate amount of air pressure. Simultaneous operation is used in applications where relatively more heating or airflow capacity is needed than what one unit can deliver. During simultaneous operation, two or more units operate in tandem using a single duct and feedback means, typically a thermostat that causes the units to turn ON/OFF simultaneously. At least a single wire line is required to convey information between units connected together.

There have been many endeavors to provide an efficient means of communicating data between units operating simultaneously. One such approach for twinning units is aimed at communication between two HVAC units, where the system may be limited to twinning applications. Data transmitted during a negative half of the line frequency is a duplicate of that transmitted during a positive half cycle. Hence, restricted data may be transferred in this system as the twinning method may be restricted to transmission of data in terms of PWM (Pulse Width Modulation) signals.

After recognizing the data restrictions, the inventor hereof sought to develop and discloses herein methods which provide an approach for transmitting data over at least a single wire line between a plurality of units operating simultaneously. As disclosed herein, a method in accordance with an exemplary embodiment of the present disclosure can be essentially divided into three main parts or steps:

(1) Phase/Polarity Detection: A controller associated with each unit detects an in phase/out of phase state of an input AC power supply provided to each unit.

(2) Auto Phase Correction: If the input AC power supply is out of phase, the controller associated with each unit adjusts a reference point such that the signals are in phase.

(3) Data Communication: Various types of data can be communicated systematically between the plurality of units based on predetermined priority.

The description of a method in accordance with an exemplary embodiment of the present disclosure is provided based on FIGS. 1 to 5 and specifically referring to simultaneous operation of units, typically furnaces in the illustrated embodiment. But methods in accordance with the present disclosure are not limited to any specific application as they can be adapted to transmit any type of data between any type of two or more units.

Figure 1:
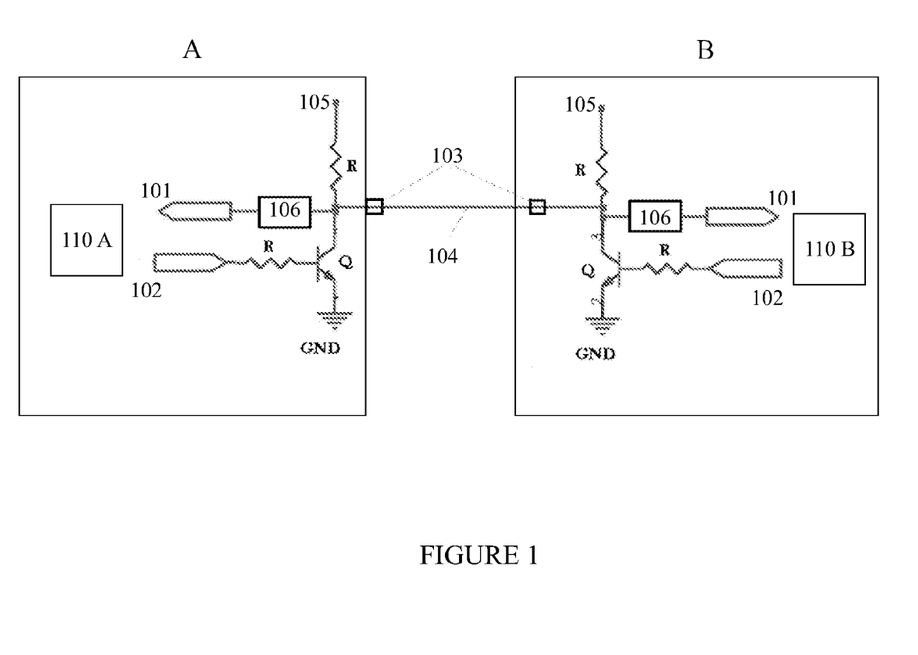
FIG. 1 illustrates a schematic representation of simultaneous operation of two units in accordance with an exemplary embodiment of the present disclosure.

FIG. 1 is a schematic representation of simultaneous operation of two units in accordance with an exemplary embodiment of the present disclosure. In this example, the system adopts a method of the present disclosure and comprises two units (not shown). A control system A, B is associated with each unit.

The control systems A, B communicate with each other over a Twin_Line 104 (broadly a communication link). In accordance with an exemplary embodiment, the Twin_Line 104 comprises a single physical electrically-conductive wire. But the Twin_Line 104 may include more than one physical conductive wire in other embodiments. For example, two or more Twin_Lines may be used for longer communication.

The Twin_Line 104 is connected to a Twin_Connector 103 on each control system A, B. The control system A, B associated with each unit is individually connected to a voltage supply denoted by Twin_Voltage 105. Each control system A, B comprises a controller 110A, 110B, respectively, and a switching device denoted by Q for switching the Twin_Voltage 105 to ground.

Each controller 110A, 110B comprises an input port pin which is Twin_In pin 101 and an output port pin which is Twin_Out pin 102. Optionally, each control system A, B comprises a signal conditioner 106 connected to Twin_In pin 101 for conditioning the signal to be read by the controller 110A, 110B for further processing.

Twin_Voltage 105 is typically any voltage understandable by the microprocessor. In accordance with an exemplary embodiment, the Twin_Voltage 105 is a Direct Current (DC) voltage supply. In order to transmit information, the controller 110A, 110B drives the Twin_Out pin 102. The controller 110A, 110B reads the data on Twin_Line 104 with the help of Twin_In pin 101. Data on the Twin_Line 104 is represented by the presence or absence of Twin_Voltage 105. Furthermore, the presence or absence of Twin_Voltage 105 on the Twin_Line 104 is also decided by the controller 110A, 110B by means of the switching device Q.

In accordance with an exemplary embodiment, the switch Q is at least one of a Bipolar Junction Transistor (BJT), a Field Effect Transistor (FET), or a semiconductor transistor. The operation of the switch Q is controlled by the controller 110A, 110B by driving the Twin_Out pin 102.

Presence of Twin_Voltage 105 on the Twin_Line 104 is represented by binary signal "1" or logic HIGH. Absence of Twin_Voltage 105 on the Twin_Line 104 is represented by binary signal "0" or logic LOW. A reference AC power supply is provided to each controller 110A, 110B associated with each unit, to generate a reference for data to be transmitted. The reference AC power supply is attenuated and conditioned to a suitable level thereby enabling the microprocessor to read it.

Figure 2:
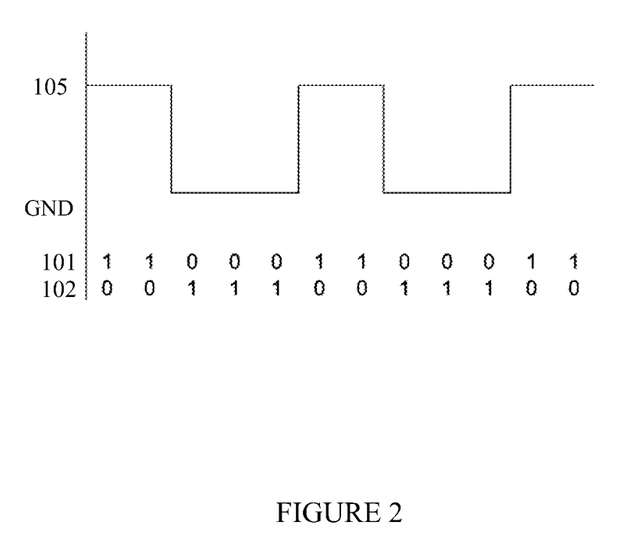
FIG. 2 illustrates a graphical representation of data transmitted by a controller associated with each unit shown in FIG. 1.

FIG. 2 is a graphical representation of data transmitted by the controllers 110A, 110B over a wire line. In accordance with an exemplary embodiment, inverting logic is used wherein the data read by Twin_In 101 is inverse or complement to the data transmitted on Twin_Out 102 to drive Twin_Out 102 and control/actuate the switch Q. Alternatively, non-inverting logic may be used whereby data read by Twin_In 101 is the same as data transmitted on Twin_Out 102 to drive Twin_Out 102 and control the operation of switch Q. Because both controllers 110A, 110B share a common Twin_Line 104, when data is transmitted simultaneously, the resultant data is logical AND'ing of the data from the individual units, wherein LOW signal overrides HIGH signal. In accordance with another exemplary embodiment, the resultant data can be any logical Boolean operation performed on the data.

As indicated in table 1 herein below, the resultant data (column C5) on Twin_Line 104 is logical AND'ing of data transmitted by the controller 110A (column C2) and the controller 110B (column C4).

TABLE 1

| C1 | C2 | C3 | C4 | C5 |
|---|---|---|---|---|
| Controller (110A) | | Controller (110B) | | Resultant data |
| Twin_Out | Twin_Line (Ideally) | Twin_Out | Twin_Line (Ideally) | Twin_Line (Actually) |
| 0 | 1 | 0 | 1 | 1 |
| 0 | 1 | 1 | 0 | 0 |
| 1 | 0 | 0 | 1 | 0 |
| 1 | 0 | 1 | 0 | 0 |

Figure 3:
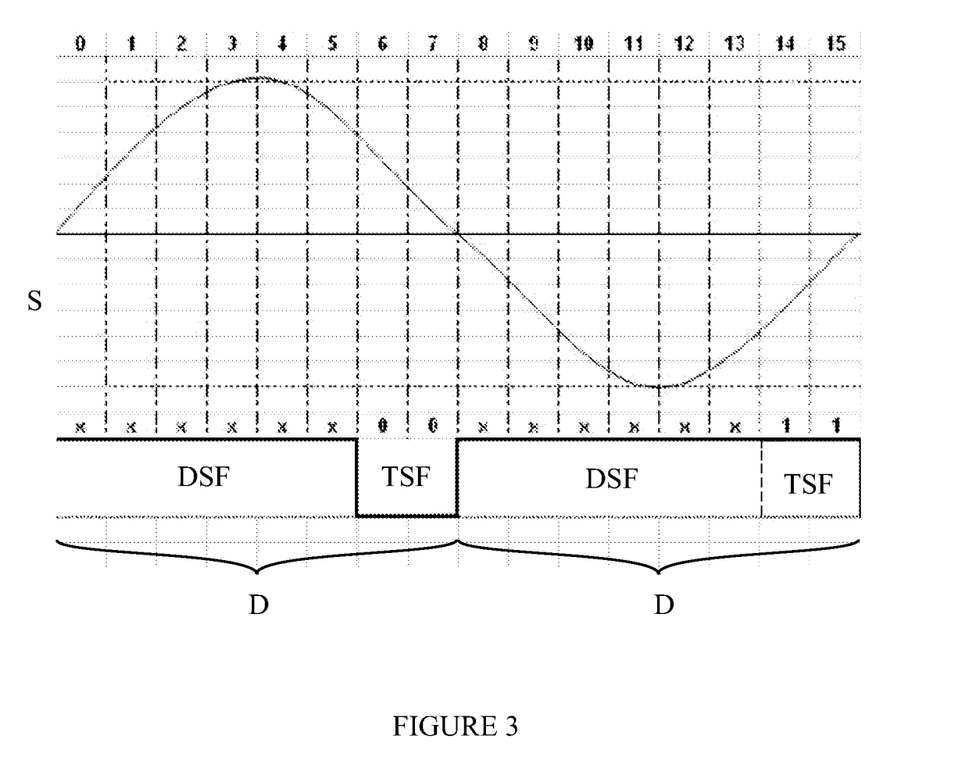
FIG. 3 illustrates a graphical representation of frequency signal of an input alternating current (AC) power supply in accordance with an exemplary embodiment of the present disclosure.

FIG. 3 is a graphical representation of frequency signal of an input alternating current (AC) power supply in accordance with an exemplary embodiment the present disclosure. Data (D) on the Twin_Line 104 is transmitted and monitored with respect to the reference AC power supply frequency signal (S). The reference AC power supply frequency signal (S) is divided into a predetermined number of equal time segments to constitute a frame comprising a predetermined number of bits. In accordance with an exemplary embodiment, if the reference AC power supply frequency signal (S) is 60 Hertz (Hz), then dividing the reference AC power supply frequency signal (S) into sixteen equal segments forms sixteen bits, with bit period for each bit being 1 millisecond (ms) thereof. The number of bits and the duration of bit period depend upon the integer number by which the AC power supply frequency is divided.

The number of bits and the duration of bit period is predefined based on requirement. For a predefined bit period, the presence of Twin_Voltage 105 on the Twin_Line 104 is represented by binary signal "1" or logic HIGH and absence of Twin_Voltage 105 on the Twin_Line 104 is represented by binary signal "0" or logic LOW. The data on the Twin_Line 104 is transmitted and received with respect to a common reference point on the reference AC power supply frequency signal (S). In accordance with an exemplary embodiment, a common reference point is the zero crossing point of the AC power supply frequency signal (S) and typically, an interrupt signal is generated at the zero crossing point of AC power supply frequency signal. Alternatively, any point on the AC power supply frequency signal can be used as a reference point and an interrupt signal can be generated accordingly. For comparing and detecting an in phase/out of phase state of the AC power supply frequency signal (S) on all units, the reference point on the AC power supply frequency signal (S) of all units are identical.

In order to determine whether the reference AC power supply frequency signal in all the units is in phase or out of phase with each other, a data frame denoted by Data_Signal_Frame (DSF) and a template frame denoted by Template_Signal_Frame (TSF) are identified from the segments formed by dividing the AC power supply frequency signal (S). The Data_Signal_Frame (DSF) and the Template_Signal_Frame (TSF) are logically OR'ed and transmitted on the Twin_Line 104. The Data_Signal_Frame (DSF) is a variable frame depending on the application of the unit and representing data being transmitted on the Twin_Line 104. The Template_Signal_Frame (TSF) is a constant reserved data.

In accordance with the illustrated exemplary embodiment, the Template_Signal_Frame (TSF) comprises two bits, wherein bit positions 6 and 7 during a positive cycle of the reference AC power supply frequency signal (S) and bit positions 14 and 15 during a negative cycle of the reference AC power supply are reserved for the Template_Signal_Frame (TSF), from the sixteen bits formed by dividing the reference AC power supply frequency signal (S). The other bit periods forming the Data_Signal_Frame (DSF) are denoted by 'X' (referring to a 'don't care' condition being either '0' or '1'). Alternatively, the Template_Signal_Frame (TSF) is formed at any predetermined bit position and can be of any predefined signal level. When the data transmitted on Twin_Line does not contain a Template_Signal_Frame (TSF), it is concluded that the reference AC power supply frequency signal (S) of that particular unit is out of phase.

In practice, phase of AC power supply frequency is changed when physical connections of the supply are swapped. Although, such an occurrence is difficult to predict, methods in accordance with the present disclosure are capable of taking corrective action if such a swapping does occur accidentally.

Figure 4:
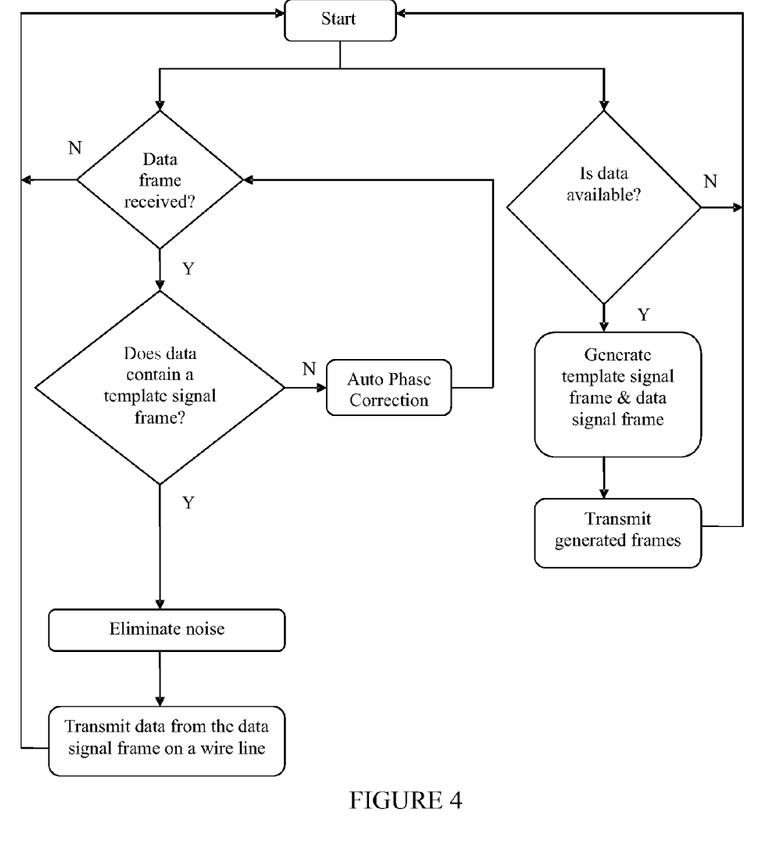
FIG. 4 illustrates a flowchart representing steps involved in phase detection and correction in accordance with an exemplary embodiment of the present disclosure.
Figure 5:
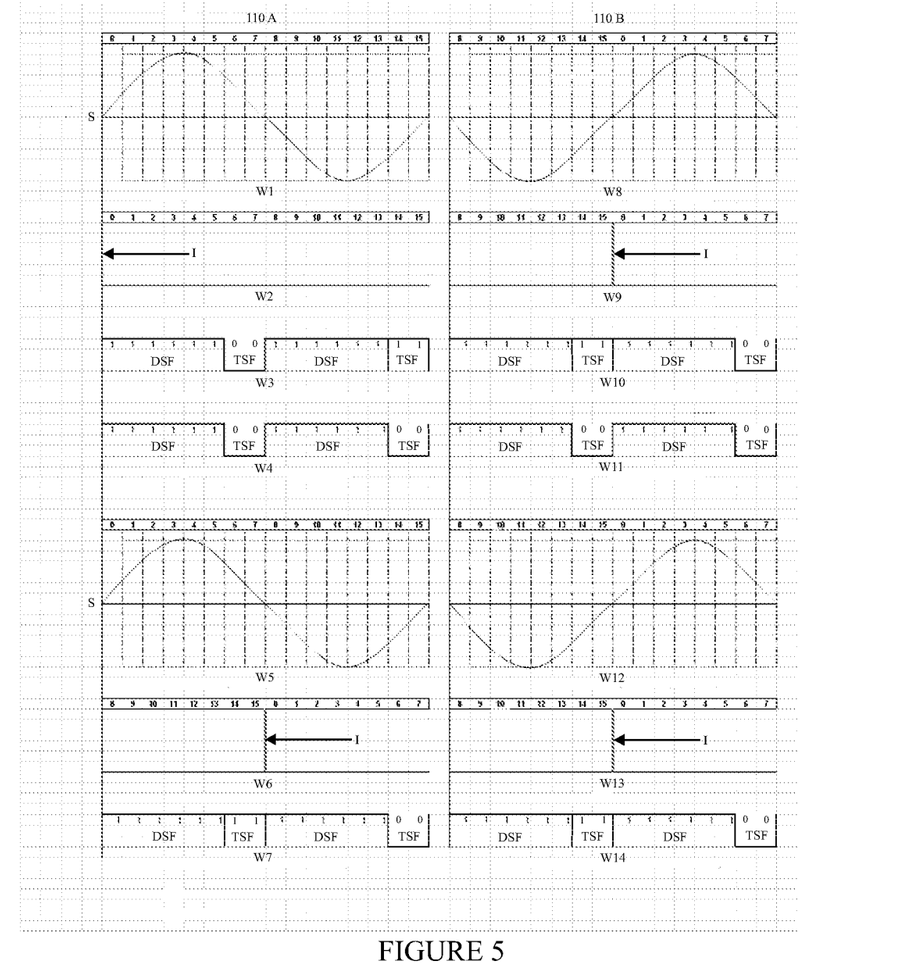
FIG. 5 illustrates a graphical representation of phase detection and correction in accordance with an exemplary embodiment of the present disclosure.

FIG. 4 illustrates a flowchart representing the steps involved in phase detection and correction in accordance with an exemplary embodiment of the present disclosure. FIG. 5 is a graphical representation of phase detection and correction in accordance with an exemplary embodiment of the present disclosure. When data is transmitted on the Twin_Line 104, the controller 110A, 110B associated with each unit on the Twin_Line 104 analyzes the data by trying to identify the Template_Signal_Frame (TSF) OR'ed with the Data_Signal_ Frame (DSF) in the received data. If the received data does not contain a Template_Signal_Frame (TSF), the controller 110A, 110B associated with the corresponding unit concludes that the reference AC power supply is out of phase and shifts its interrupt (I) edge.

As shown in FIG. 5, bit positions 6, 7 and 14, 15 are reserved for the Template_Signal_Frame (TSF). The controller 110A, 110B associated with both the units checks for a LOW or "0" signal at bit positions 6, 7 and for a HIGH or "1" signal at bit positions 14, 15. If the controller is not able to detect a LOW or "0" signal at bit positions 6, 7 and a HIGH or "1" signal at bit positions 14, 15, the controller 110A concludes that the reference AC power supply frequency signal (W1) of the unit associated with the controller 110A is out of phase with the reference AC power supply frequency (W8) of the unit associated with the controller 110B.

In accordance with an exemplary embodiment, the interrupt (I) is provided on the rising edge of the zero crossing point of the reference AC power supply frequency (W2, W9). The interrupt (I) serves as a reference point for the controllers 110A, 110B and initiates counting of the bit positions from thereon. Because the reference AC power supply (W1 and W8) of both the units are out of phase, the bit position '0' on W1, W2 corresponds to the bit position '8' on W8, W9. As a result, the reference points (I) for the controller 110A and controller 110B are different. Both the controllers 110A, 110B have to transmit data 0xFCFF (W3) containing Template_Signal_Frame (TSF) at bit positions 6, 7, 14, 15 and Data_Signal_Frame (DSF) at the remaining bit positions.

Because the reference points (I) for each of the controllers 110A, 110B are different, the controller 110B generates 0xFFFC (W10) and the resultant signal appears on the Twin_ Line 104 as 0xFCFC (W4, W11). When the controller 110A completes checking its bit position 15, the controller 110B would still be checking its bit position 7. As a result, the controller 110A would conclude that the data received at bit positions 14 and 15 is not the same as the data transmitted.

Accordingly, the controller 110A shifts its interrupt (I) edge from the rising edge of the zero crossing point of the reference AC power supply frequency signal (W5, W6) to the falling edge of the zero crossing point of the reference AC power supply frequency signal (W12, W13). As a result, the data in bit positions '0' to '15' of both the controllers 110A and 110B are the same (W6, W13) thus leading to a successful transmission of data (W7, W14) on the Twin_Line 104.

Thus using the aforementioned method, a controller associated with a unit can reverse its Template_Signal_Frame (TSF) to nullify the action of shifting of the interrupt edge (I) as explained herein above. Practically, there is a time difference of half cycle or 8 ms in the reference AC power supply (60 Hz frequency) signal of the two units, which are out of phase. The time difference depends on the frequency and would accordingly vary for a 50 Hz reference AC power supply. Shifting the interrupt (I) edge creates a common reference point resulting in all the controllers having an identical Template_Signal_Frame (TSF) embedded in the transmitted data on the Twin_Line 104.

The method of communication between simultaneously operating units according to an exemplary embodiment of the present disclosure can be divided into three layers:

(1) Physical layer—A physical layer comprises hardware as discussed in the aforementioned control systems 110A, 110B. The control systems 110A, 110B associated with both the units communicate with each other through the physical layer on a physical medium.

(2) Data Link layer—Data link layer provides a functional and procedural means to transfer data between the controllers 110A, 110B. Additionally, the data link layer provides means to detect and possibly correct errors that may occur in the physical layer. When the controllers 110A, 110B attempt to use the Twin_Line 104 simultaneously, frame collisions occur. The data link layer specifies a means for the controllers 110A, 110B to detect and recover from such collisions, and further provides methods to prevent them. Furthermore, the data link layer provides acknowledgements and re-transmission of data. The basic services provided by the data link layer include auto phase detection, auto phase correction, and optionally Cyclic Redundancy Check (CRC), checksum and parity bit check.

(3) Application layer—Application layer comprises different applications based on the requirement.

Referring to FIG. 3, the 60 Hz reference AC power supply frequency signal (S) is divided into sixteen equal segments to constitute a frame comprising sixteen bits, with bit period for each bit being 1 ms thereof. In accordance with an exemplary embodiment, duration of each bit period is used to transmit the speed of operation of a unit. Thus, $\frac{1}{16}^{th}$ of 60 Hz time duration in each cycle is used to transmit the speed of operation of a unit. To calculate the number of speed related data, it is assumed that 'n' denotes the number of speed related data that is transmitted and duration 't' denotes the time period to transmit one speed related data. Because the bit period for each bit is 1 ms, each cycle of the 60 Hz AC power supply frequency signal (S) constitutes 16 ms time frame. During both the positive and negative half cycles, the data transmitted would be 'nt'. Furthermore, a different set of data would be transmitted during each half cycle. Thus, for a 16 ms time frame, the data transmitted can be represented by:

$$nt=16$$

wherein $t=1$ ms, $n=16$

Four bits represented by Template_Signal_Frame (TSF) are used for phase detection and correction, such that:

$$n=16-4=12$$

Thus, 12 different speed related data can be transmitted using a method in accordance with an exemplary embodiment of the present disclosure. Thus, the disclosed exemplary embodiments of methods for transmitting speed related data of a unit may provide one or more distinct advantages over methods known in the art.

Methods according to exemplary embodiments of the present disclosure can be adapted to other applications such as, but not limited to, the applications listed below. For example, a method of the present disclosure can be used for simultaneous operation of fixed speed units as well as variable speed units by simultaneously communicating the speed of the units in Cubic Feet per Minute (CFM). A method of the present disclosure can be used to provide an alert if variable speed units are used (to stop the operation). A method of the present disclosure can be used to synchronize the direction of operation of different units operating simultaneously. A method of the present disclosure can be used for communicating data of any amount or size. A method of the present disclosure can be used for communication at any baud rate and is applicable for low baud rate communication also. A method of the present disclosure can be used for communicating data between units located far away from each other by using at least one physically electrically-conductive wire connection. A method of the present disclosure can be used for communicating any type of data between at least two units by incorporating at least one of the following fields in the aforementioned communication method—unit number, message number, data length, CRC, and parity field.

| Unit Number | Data Length | Object Number | Data | CRC |
| --- | --- | --- | --- | --- |

Different units can communicate with each other in accordance with various exemplary embodiments of the communication methods disclosed herein. For example, a master-slave communication method can be used by different units to communicate with each other. A communication method having run time arbitration can be used by different units to communicate with each other. The unit having high priority would be able to gain access and transmit data on the communication line. A message driven communication method can be used by different units to communicate with each other. The message having high priority would be able to gain access and transmit data on the communication line. A communication method wherein each unit would transmit data in a circular fashion can be used by different units to communicate with each other. Each unit would have an allotted time slot for transmitting the data. A communication method wherein data transmitted is queued data transmitted in a predetermined order based on predetermined priority.

Thus, the approach of the methods of the present disclosure is not just limited to simultaneous operation of multiple units but can be used as a communication method to convey various types of data such as temperature, CFM data, and the like by using different embodiments of the methods of the present disclosure. Exemplary embodiments of the methods of the present disclosure may alleviate most of the problems of prior approaches and may provide a more efficient simultaneous operation of multiple units and a reliable method to communicate any type of data.

One or more (but not necessarily any or all) of the following technical advancements or advantages may be provided or realized with an exemplary embodiment of a method of the present disclosure, such as:

different units operating simultaneously at different speeds;

AC power supply phase detection and auto correction;

simultaneous operation of multiple units located far away from each other;

simultaneous operation of variable speed units as well as fixed speed units;

provision of alerting means if variable speed units are used when operating simultaneously;

synchronized direction of operation of different units operating simultaneously;

unlimited amount of data to be communicated;

usability in different applications as a communication method or protocol to convey any type of data for any operation; and usability for communicating data between different units located far away from each other by using at least one physically conductive wire connection.

Exemplary embodiments are disclosed of methods of communication on a single line in a twinning application utilizing both the positive and negative half wave periods to convey information in conjunction with a "template signal frame". In an exemplary embodiment, the positive and negative half waves are broken into 8 millisecond segments (for 60 Hertz) with the last 2 segments forming the template reference for communication. This exemplary method may generally include three basic parts: Phase/Polarity Detection (control is configured to detect if communicating units are in phase or out of phase of power supply frequency), auto phase correction (mechanism implemented such that if units are out of phase, then adjust them so that all units will use a common reference point), and communication over one or more Twin_Lines (different kinds of data can be communicated over a Twin_line). Advantageously, this exemplary method can be used for twinning of motor for more than 3 speeds even in reversed polarity. This exemplary method is able to detect reverse phase of line frequency and auto correct it for twinning. This exemplary method can be used for twinning of a variable speed motor. There may be a provision to give alert if variable size motors are used, which will stop operation automatically. It may be possible to twin direction of the motor. With this exemplary method, there is not any restriction on the amount of data to be communicated as approach may be similar to a communication protocol rather than PWM signals. This exemplary method may be used in various applications, e.g., as a communication protocol to convey information for any operation.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances. Or, for example, the term "about" as used herein when modifying a quantity of an ingredient or reactant of the invention or employed refers to variation in the numerical quantity that can happen through typical measuring and handling procedures used, for example, when making concentrates or solutions in the real world through inadvertent error in these procedures; through differences in the manufacture, source, or purity of the ingredients employed to make the compositions or carry out the methods; and the like. The term "about" also encompasses amounts that differ due to different equilibrium conditions for a composition resulting from a particular initial mixture. Whether or not modified by the term "about," the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A line communication method to communicate data over at least one wire line between a plurality of units, each of the plurality of units being associated with a control system comprising a controller, the method comprising:
providing a voltage signal to each controller;
providing an input AC power supply to each of the plurality of units;
conditioning each of the input AC power supplies to generate a conditioned reference signal for each controller;
determining in phase or out of phase state of the conditioned reference signals; the determining comprising:

feeding the conditioned reference signal to each controller;

dividing the conditioned reference signal into a predetermined number of segments, each of the segments associated with a time period;

generating a template signal frame and a data signal frame at predetermined segments of the conditioned reference signal;

generating an interrupt signal in each controller on a first predetermined location on the conditioned reference signal, the interrupt signal being a reference point on each of the conditioned reference signals, the first predetermined location being identical for each controller;

logically ORing of the template signal frame and the data signal frame; transmitting the logically ORed signal over the at least one wire line; and analyzing the transmitted ORed signal relative to the reference point for detecting existence or non-existence of the template signal frame thereby determining the in phase or out of phase state of the conditioned reference signals;

correcting the out of phase state of the conditioned reference signal in the event that non-existence of the template signal frame is detected, the correcting comprising shifting the interrupt signal, thereby the reference point of at least one controller to a second predetermined location on the conditioned reference signal, to align the reference point on each of the conditioned reference signals; and transmitting the data from the data signal frame of the phase corrected conditioned reference signal over the at least one wire line based on predetermined priority.

2. The line communication method of claim 1, wherein transmitting the data further comprises the step of noise elimination by at least one method that includes Cyclic Redundancy Check (CRC), checksum, and parity bits.

3. The line communication method of claim 1, wherein the plurality of units is selected from the group consisting of HVAC units, furnace, air handler units, air conditioner units, heat pump units, and thermostats.

4. The line communication method of claim 1, wherein the controller is selected from the group consisting of microcontrollers, microprocessors, Application Specific Integrated Circuits (ASIC), and Digital Signal Processors (DSP).

5. The line communication method of claim 1, wherein the template signal frame is a constant reserved data.

6. The line communication method of claim 1, wherein the data signal frame is a variable frame depending on the application of the unit and representing the data being transmitted.

7. The line communication method of claim 1, wherein the predetermined priority is determined by the controller and the data is transmitted by the unit having highest priority.

8. The line communication method of claim 1, wherein the data transmitted over the at least one wire line is logical AND-ing of data transmitted by each of the plurality of units.

9. The line communication method of claim 1, wherein the controller assigns a pre-determined time slot to each of the plurality of units for transmitting the data in a circular manner.

10. The line communication method of claim 1, wherein the data transmitted over the at least one wire line is queued data transmitted in a predetermined order based on the predetermined priority.

11. A system comprising at least two units operable for communicating data based on the line communication method of claim 1.

12. A system comprising:

a first control system associated with a first unit, the first control system including a first controller;

a second control system associated with a second unit, the second control system including a second controller;

at least one communication line between the first and second control systems over which the first and second control systems may communicate with each other;

when a voltage signal is provided to each controller and an input AC power supply is provided to each of the first and second units, at least one of the first and second control systems are operable for:

conditioning input AC power supplies to the first and second units to generate a conditioned reference signal for each controller;

determining in phase or out of phase state of the conditioned reference signals, the determining comprising:

feeding the conditioned reference signal to each controller;

dividing the conditioned reference signal into a predetermined number of segments, each of the segments associated with a time period;

generating a template signal frame and a data signal frame at predetermined segments of the conditioned reference signal;

generating an interrupt signal in each controller on a first predetermined location on the conditioned reference signal, the interrupt signal being a reference point on each of the conditioned reference signals, the first predetermined location being identical for each controller;

logically ORing of the template signal frame and the data signal frame;

transmitting the logically ORed signal over the at least one communication line; and analyzing the transmitted ORed signal relative to the reference point for detecting existence or non-existence of the template signal frame thereby determining the in phase or out of phase state of the conditioned reference signals;

correcting the out of phase state of the conditioned reference signal in the event that non-existence of the template signal frame is detected, the correcting comprising shifting the interrupt signal, thereby the reference point of at least one controller to a second predetermined location on the conditioned reference signal, to align the reference point on each of the conditioned reference signals; and transmitting the data from the data signal frame of the phase corrected conditioned reference signal over the at least one communication line based on predetermined priority.

13. The system of claim 12, wherein:

the first and second units are selected from the group consisting of HVAC units, furnace, air handler units, air conditioner units, heat pump units, and thermostats; and/or the first and second controllers are selected from the group consisting of microcontrollers, microprocessors, Application Specific Integrated Circuits (ASIC), and Digital Signal Processors (DSP).

14. The system claim 12, wherein:

the template signal frame is a constant reserved data; and/or the data signal frame is a variable frame depending on the application of the unit and representing the data being transmitted;

the predetermined priority is determined by the first and/or second controller and the data is transmitted by the unit having highest priority;

the data transmitted over the at least one communication line is logical AND-ing of data transmitted by each of the first and second units;

the first and/or second controller assigns a pre-determined time slot to each of the first and second units for transmitting the data in a circular manner.

15. The system of claim 12, wherein the data transmitted over the at least one communication line is queued data transmitted in a predetermined order based on the predetermined priority.

16. The system of claim 12, wherein:

each of the first and second control systems is individually connected to a voltage supply;

each of the first and second control systems comprises a switching device for switching a voltage connection to ground;

the first and second controllers include an input port pin and an output port pin, whereby operation of the switch is controlled by the corresponding first or second controller by driving the output port pin, and whereby data on the at least one communication line is represented by the presence or absence of voltage on the at least one communication line which is determined by the first and second controllers by means of the switching devices.

17. The system of claim 16, wherein each of the first and second control systems comprises a signal conditioner connected to the corresponding input port pin for conditioning the signal to be read by the controller for further processing.

18. The system of claim 16, wherein the switch comprise at least one of a Bipolar Junction Transistor (BJT), a Field Effect Transistor (FET), or a semiconductor transistor.

19. The system of claim 12, wherein the at least one communication line comprises a twin line connected to a connector on each of the first and second control systems.

20. The system of claim 12, wherein the at least one communication line comprises a single physical electrically-conductive wire connected to a connector on each of the first and second control systems.

* * * * *